H. W. FAUCETT.
Apparatus for Raising Oil, &c., from Wells.
No. 140,692. Patented July 8, 1873.
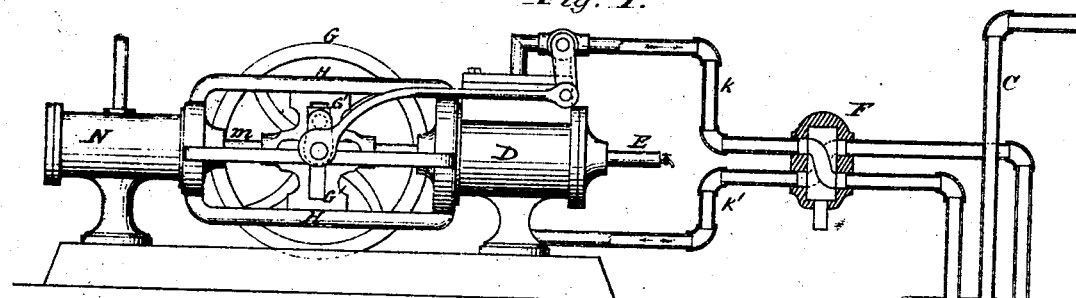
Fig. 1.
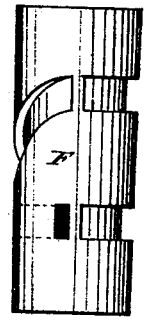
Fig. 2.
Fig. 3.
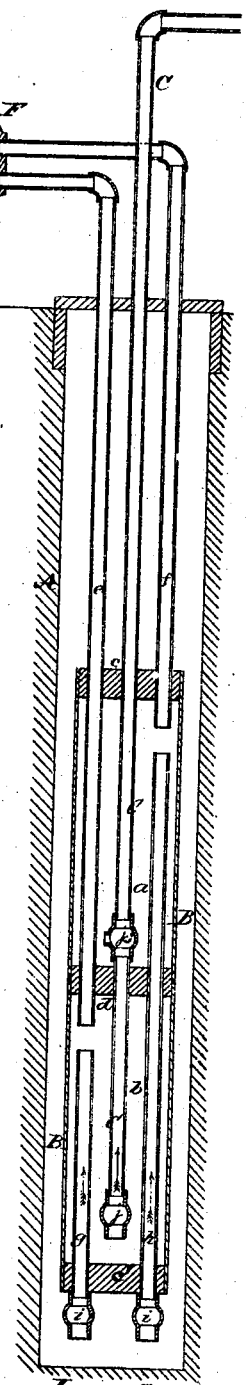
Witnesses:
A. M. Norris.
Wm. Payton
Inventor:
H. W. Faucett.
by
James L. Norris.
Attorney.

United States Patent Office.

HIRAM W. FAUCETT, OF TITUSVILLE, PENNSYLVANIA.

IMPROVEMENT IN APPARATUS FOR RAISING OIL, &c., FROM WELLS.

Specification forming part of Letters Patent No. 140,692, dated July 8, 1873; application filed May 1, 1873.

*To all whom it may concern:*

Be it known that I, HIRAM W. FAUCETT, of Titusville, in the county of Crawford and State of Pennsylvania, have invented certain new and useful Improvements in Apparatus for Raising Oil or other Liquids from Artesian or other Wells, of which the following is a specification:

The object of my invention is to facilitate the raising of oil or other liquids from Artesian or other wells by means of a pneumatic-cylinder placed at or near the bottom of such wells, the said cylinder being connected by pipes or tubes with an air-pump and provided with a delivery-pipe.

In carrying out my invention I employ a cylinder or tube composed of two sections, which is inserted into the Artesian or other wells, and sunk nearly or quite to the bottom thereof. The ends of each section of this tube are closed by a plug or partition, which divides the tube into separate chambers. An air-tube in connection with an air-pump is connected with each chamber. Supply-tubes, provided with valves to prevent the return of the oil or liquid, are also provided to conduct the liquid into each chamber, and a common delivery-tube provided with check-valves serves to convey the oil or liquid from both of the above chambers. Air is alternately forced into and exhausted from the compartments of the cylinder in the well by means of the air-pump in such manner that the air is forced into the lower chambers at the same time that it is exhausted from the upper chamber, and vice versa. The flow of air to and from the air-pump by the respective tubes is regulated by a four-way valve. The air-pump which forces the air into and exhausts the same from the section is operated by a steam-cylinder. The piston-rod of the steam-cylinder and also the piston-rod of the air-pump are connected to a cross-head sliding in bearings arranged between the steam-cylinder and the air-pump. A balance-wheel supported on a shaft, to which a crank is affixed, is provided with a pin, which revolves in bearings supporting and sliding in vertical bearings in the cross-head to regulate the motions of the steam and air-pistons; but that my invention may be fully understood I will proceed to describe the same more in detail by aid of the accompanying drawing, in which—

Figure 1 represents a view of my improved apparatus for raising oil or other liquid from Artesian or other wells; Figs. 2 and 3, views of the four-way valve.

A represents an Artesian, oil, or other well, near the bottom of which a tube or cylinder, B, is sunk. This cylinder is made, preferably, in two sections, *a* and *b*, the ends of which are closed by plugs *c c' d* in such manner as to render the joints water and air tight. The plug *d* serves to close the lower and upper ends of the respective sections, and thus divide the tube into two compartments. In the process of raising oil by this cylinder I use an air-pipe, *e*, opening in the lower section, and a similar pipe, *f*, opening into the upper section or compartment, both being well packed in the plugs, so as to prevent the escape of air. Tubes *h g* opening into the upper and lower compartments, respectively, are inserted from the bottom of the cylinder, and are provided at the lower ends, which open into the well, with check-valves *i i*. Through these tubes the oil is introduced into the cylinder and the valve prevents its reflux. C is a tube having check-valves *j* opening in both compartments and serving as an exit for the oil or liquid in both compartments.

The operation of this part of my invention is as follows: Pipes *e* and *f* are connected with an air-pump in such a manner as that when air is forced down one pipe it is exhausted from the other—that is, if air is forced down pipe *e* it will be exhausted from pipe *f*—hence, compartments *b* will be filled with air, thus forcing the oil or liquid in it up through the discharge-pipe C, and the air will be exhausted from compartment *a*, causing the liquid to ascend through pipe *h* and fill said compartment, and vice versa. As the liquid ascends through the discharge-pipe the check-valve *j* prevents its running back. In the one case the pressure exerted is sufficient to expel the oil, and in the other the partial vacuum formed is able to cause an influx of oil through the supply-pipe.

In the drawings I have shown a peculiar form of air-pump for use in connection with the cylinder, and while I do not limit myself to its use, yet I consider it the best adapted for this purpose.

D represents a pump-cylinder connected with a suitable air-chamber and having two valves, one at top and one at bottom, or, preferably, both at top. The cylinder is surrounded with a suitable water-jacket, and has a tubular piston-rod, $l$, into both of which water is introduced to keep the cylinder cool. Pipes $k\ k'$ convey the air from this pump to the air-pipes $e\ f$, the air first passing through a valve, F, of peculiar construction. This valve has four ways through it, which alternately open and close the ports leading into pipes $e\ f$ and $k\ k'$. The pump-valves and pistons are so arranged as to force air through one pipe and to exhaust it from the other, and the valve F is so operated as to shift the influx and exhaust from one chamber or compartment of the cylinder to the other, as occasion requires.

As a means for operating the pump-piston, I have shown a driving-wheel, G, hung in suitable bearings, and provided with a crank, the pin upon which is secured in bearings in a cross-head, G', which slides back and forth in guides H H. The piston-rod is connected with this cross-head and receives its motion from it. $m$ is the piston-rod of the engine-cylinder N, which imparts motion to the pump.

Connections, such as belts and pulleys, gearing, and other mechanism, may be used to convey the motion to the valve F for reversing it when necessary and as often as required.

Having thus described my invention, what I claim as new, and desire to secure by Letters Patent, is—

1. In an apparatus for raising oil or other liquid from wells, the combination of a sectional pneumatic cylinder placed at or near the bottom of the well, pipes for creating a vacuum and pressure in the sections of the cylinder inlet-tubes, a common outlet-tube opening in the sections of the cylinder, a four-way valve for shifting the pressure and exhaust from one section to another, and a double-acting air-pump, as shown and described.

2. A cylinder B divided into compartments $a\ b$, and provided with inlet-tubes $g\ h$ and their valves $i$, discharge-pipe C with valves $j$, and air-tubes $e\ f$ connected with an air-pump, substantially as and for the purpose shown and described.

In testimony that I claim the foregoing I have hereunto set my hand this 21st day of March, 1873.

HIRAM W. FAUCETT.

Witnesses:
J. J. HOLDEN,
HENRY WHITE.